US009422915B2

(12) United States Patent
Eisenberg

(10) Patent No.: US 9,422,915 B2
(45) Date of Patent: Aug. 23, 2016

(54) CUSTOMIZING A WIND TURBINE FOR SITE-SPECIFIC CONDITIONS

(71) Applicant: Siemens Aktiengesellschaft, München (DE)

(72) Inventor: Drew Eisenberg, Boulder, CO (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 208 days.

(21) Appl. No.: 14/272,531

(22) Filed: May 8, 2014

(65) Prior Publication Data

US 2015/0322917 A1 Nov. 12, 2015

(51) Int. Cl.

*F01D 1/06* (2006.01)
*F03D 7/02* (2006.01)
*F03D 1/00* (2006.01)
*F03D 1/06* (2006.01)

(52) U.S. Cl.

CPC .............. *F03D 1/0658* (2013.01); *F03D 1/001* (2013.01); *F03D 1/006* (2013.01); *F03D 1/0633* (2013.01); *F03D 1/0675* (2013.01); *F03D 7/0232* (2013.01); *F03D 7/0276* (2013.01); *F05B 2240/122* (2013.01); *F05B 2240/31* (2013.01); *F05B 2260/96* (2013.01); *Y02E 10/721* (2013.01); *Y10T 29/49718* (2015.01); *Y10T 29/49776* (2015.01)

(58) Field of Classification Search

CPC ..... F03D 1/0658; F03D 1/006; F03D 1/0675; F03D 1/0633; F03D 7/0276; F03D 7/0232; F03D 1/001; Y10T 29/49776; Y10T 29/49718; Y02E 10/721; F05B 2260/96; F05B 2240/03; F05B 2240/122

See application file for complete search history.

(56) References Cited

U.S. PATENT DOCUMENTS

| | | | | |
|---|---|---|---|---|
| 3,596,854 | A | 8/1971 | Haney, Jr. | |
| 7,293,959 | B2 | 11/2007 | Pedersen et al. | |
| 7,632,068 | B2 | 12/2009 | Bak et al. | |
| 7,914,259 | B2 | 3/2011 | Godsk | |
| 8,251,656 | B2 | 8/2012 | Stiesdal | |
| 8,448,527 | B2 | 5/2013 | Frere et al. | |
| 2003/0099546 | A1 | 5/2003 | Stiesdal | |
| 2009/0074574 | A1 | 3/2009 | Godsk et al. | |
| 2011/0142673 | A1 | 6/2011 | Fang et al. | |
| 2012/0243989 | A1 | 9/2012 | Mayda et al. | |
| 2012/0253764 | A1* | 10/2012 | Nielsen | F03D 1/0633 703/6 |
| 2013/0266441 | A1* | 10/2013 | Enevoldsen | F03D 7/0204 416/1 |
| 2014/0072441 | A1* | 3/2014 | Asheim | F03D 1/0608 416/241 R |
| 2014/0148148 | A1* | 5/2014 | Yang | H04W 36/0094 455/422.1 |

* cited by examiner

*Primary Examiner* — John C Hong

(57) ABSTRACT

After establishing a design environmental condition (26, S1) for a wind turbine blade, and engineering a coefficient of lift and a corresponding optimum blade tip speed ratio (TSR 21) that maximizes annual energy production of the wind turbine when operating under the design environmental condition, determining a site-specific condition (28, S2, S3) that changes a wind loading condition on the blade compared to the design environmental condition, and providing an add-on device (49, 50, 60) for the blade that maximizes annual energy production of the wind turbine under the site-specific condition by changing the coefficient of lift and optimum TSR of the blade. Site specific conditions may include reduced RPM (28) for noise curtailment and/or specific mean wind speeds (S2, S3). The add-on device may include a flap (49, 60) and/or vortex generators (50).

19 Claims, 5 Drawing Sheets

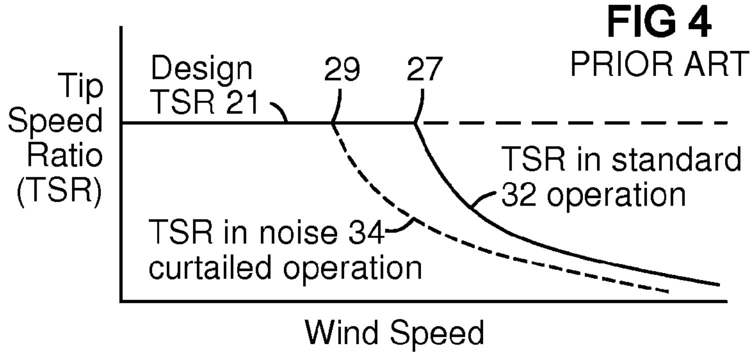
FIG 4
PRIOR ART
FIG 5
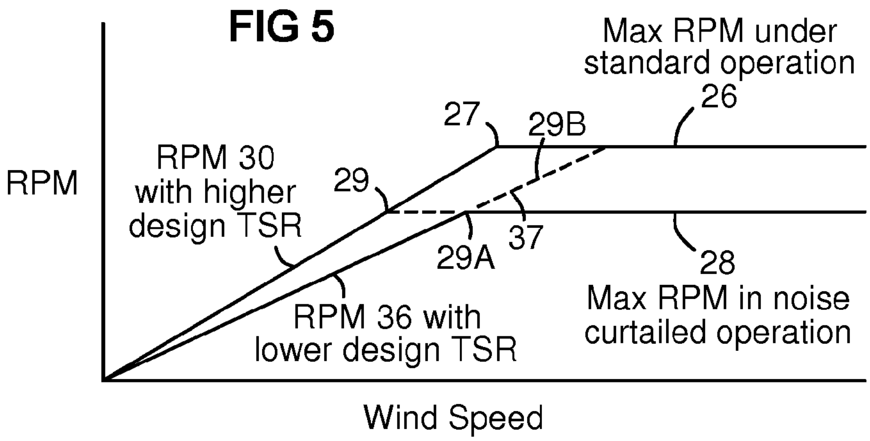
FIG 6
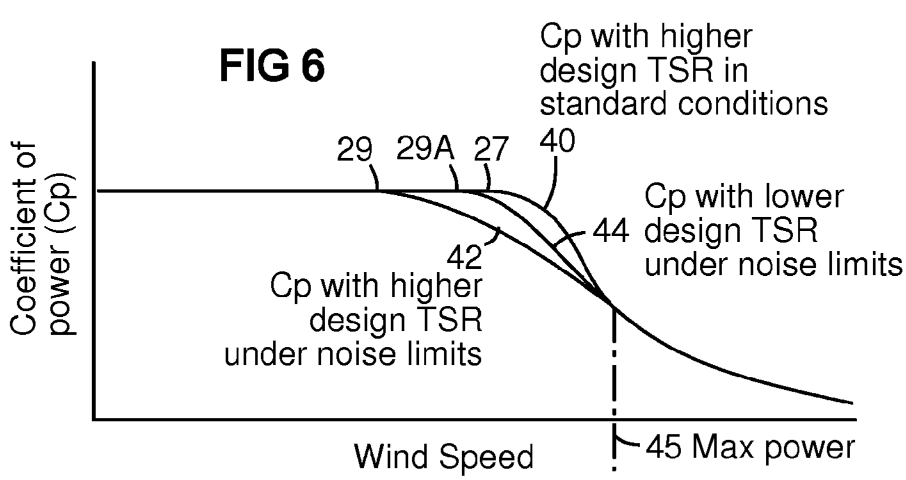

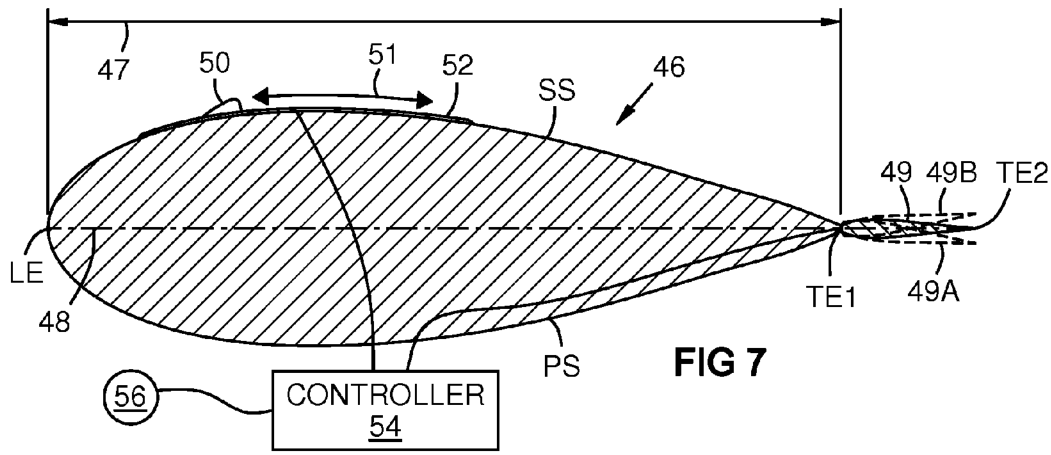
FIG 7
FIG 8
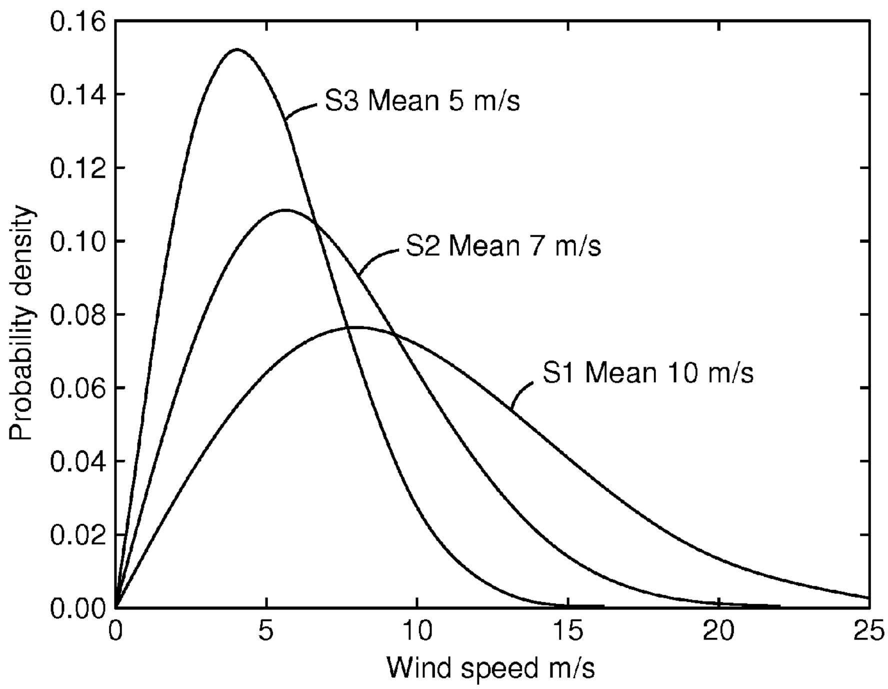

CUSTOMIZING A WIND TURBINE FOR SITE-SPECIFIC CONDITIONS

FIELD OF THE INVENTION

The invention relates generally to wind turbines, and more particularly to customizing the design and operation of a wind turbine for site-specific conditions, such as wind loading conditions or noise limits.

BACKGROUND OF THE INVENTION

A wind turbine blade design is optimized for a given standard design environment including mean wind speed, turbulence, and other factors. Once the blade mold is created, the outer geometry and aerodynamic response of the blade is fixed. Blade design is a balance between power production and turbine loads, and must meet International Electrotechnical Commission requirements for a specific wind class. Molds are expensive and blade designs are standardized and are used for many wind turbines.

BRIEF DESCRIPTION OF THE DRAWINGS

The invention is explained in the following description in view of the drawings that show:

FIG. 4 shows functions relating tip speed ratio to wind speed for a standard design operation and for a noise-curtailed operation consistent with FIG. 3.

FIG. 5 compares functions relating RPM to wind speed under two environmental conditions for a blade with a first design TSR and a blade with a lower design TSR.

FIG. 6 compares functions relating coefficient of power to wind speed under two conditions for a blade with a first design TSR and a blade with a lower design TSR.

FIG. 7 is a sectional view of a wind turbine blade with a movable trailing edge flap and a movable vortex generator.

FIG. 8 shows probability densities for three wind speed envelopes representing site-specific conditions at respective different sites or at the same site at different times.

FIG. 12 is a sectional view of a wind turbine blade designed to incorporate a flap add-on.

DETAILED DESCRIPTION OF THE INVENTION

Figure 1:
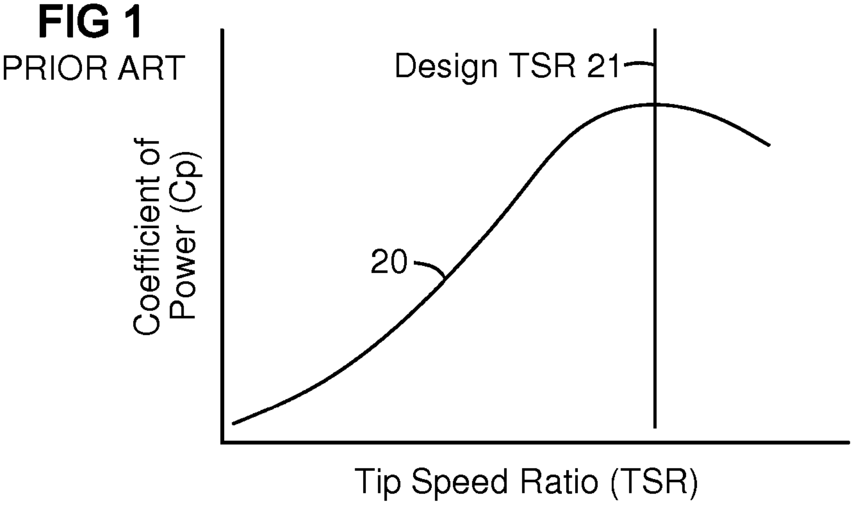
FIG. 1 shows a function relating coefficient of mechanical power to tip speed ratio (TSR), and indicating an optimum TSR.

FIG. 1 illustrates a function 20 relating coefficient of power (Cp) to tip speed ratio (TSR). TSR is the ratio of the blade tip speed to the wind speed. TSR=rotor radius (m)*rotation rate (radians/s)/wind speed (m/s). Coefficient of power is the ratio of power extracted by the rotor for a given available wind power ($Cp=P_t/P_w$), and is a measure of aerodynamic efficiency of the blades and rotor. A blade operates at maximum aerodynamic efficiency when its TSR is maintained at the maximum 21 of the Cp/TSR curve 20. A blade is engineered for given design TSR through the design of sectional lift coefficients $C_L$ along the span of the blade. Higher lift coefficients result in a lower optimum TSR. Herein the lift coefficient is calculated with respect to the main blade element, not including added flaps.

$$\text{Section coefficient of lift } c_l = \frac{l}{\frac{1}{2}\rho v^2 c}$$

where l=lift, ρ=air density, v=wind speed, and c=chord length $$\text{Section lift } l = \frac{1}{2} c_l \rho v^2 c$$

$$\text{Bladewise coefficient of lift } C_L = \frac{L}{\frac{1}{2}\rho v^2 S} \text{ or } C_L = \frac{L}{qS}$$

where L=lift, ρ=air density, v=wind speed, S=blade plan area as viewed perpendicular to the chord lines, and q=dynamic pressure.

$$\text{Bladewise lift } L = \frac{1}{2} C_L \rho v^2 S$$

$$\text{Available wind power } P = \frac{1}{2} A \rho v^3$$

where A=rotor disk area

A higher TSR design point provides higher power output for a given rotor torque, since mechanical power=torque times rotation rate. However rotor speeds are limited by mechanical loads on the rotor, noise, and generator speed limits.

Figure 2:
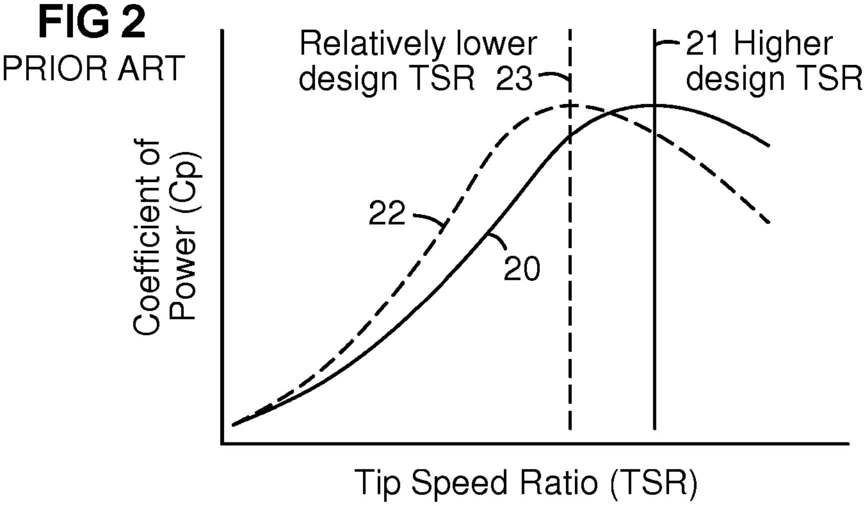
FIG. 2 compares the function of FIG. 1 to a second function for a blade designed for a lower TSR.

FIG. 2 shows Cp/TSR curves 20, 22 for two blades. One blade operates along curve 20 and has a first, relatively higher optimum TSR 21. Another blade operates along a steeper curve 22 due to higher lift coefficients, and it has a lower TSR 23 at its maximum Cp. The maximum of curve 22 may as high or higher than the maximum of curve 20 at respectively lower/higher tip speed ratios.

Figure 3:
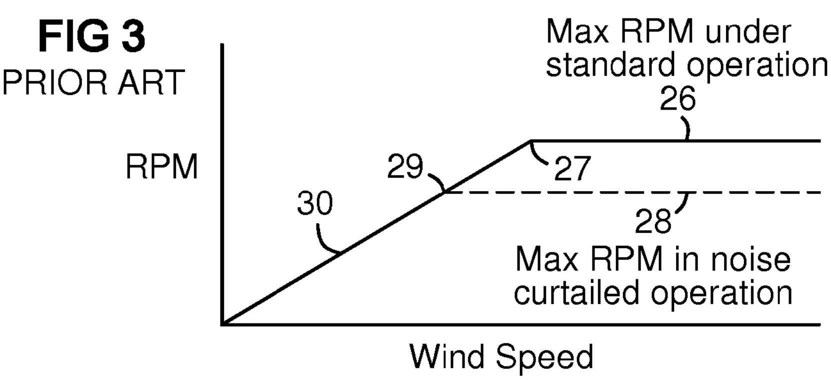
FIG. 3 shows functions relating RPM to wind speed for a standard design operation and for a noise-curtailed operation that reduces maximum RPM.

FIG. 3 shows RPM vs wind speed curves for a given blade in two alternate operational modes of a wind turbine. Under standard operating conditions the rotor reaches maximum RPM at line 26. When noise limits are imposed, the rotor is limited to a lower maximum RPM 28. Both operations maintain optimum TSRs along the slope 30 until respective inflection points 27, 29 are reached. At wind speeds above the inflection points, TSR is reduced as next shown, lowering the coefficient of power.

FIG. 4 shows the effect of the two RPM limits of FIG. 3 on the TSR of a blade with a first, higher design TSR 21. In standard operation the design TSR 21 is maintained up to inflection point 27, after which TSR drops along curve 32, since wind increases while RPM is constant (FIG. 3). In noise curtailed operation 34, the inflection point 29 occurs at a lower wind speed because the RPM limit is lower. Turbine performance is reduced in proportion to how far it operates from design TSR. Thus, efficiency drops sooner under noise curtailed operation 29, 34 than under standard operation 27, 32. This reduces annual energy production (AEP) at sites with noise limits.

The blade design for a given wind turbine model is a compromise for a range of actual site conditions. Blade airfoils are not modified in geometry for specific site conditions. However, environmental and operating conditions vary substantially from site to site. Noise limits at some sites impose permanent or temporary limits on rotor speed, and sites vary in mean wind speed and other wind power parameters. Some sites have more turbulence than others. The present inventor has recognized that for a site with frequent or permanent RPM limits, a blade with higher lift coefficient and lower TSR is more efficient, and increases annual energy production. The inventor further recognized that a blade could be customized for site conditions using add-ons such as flaps and vortex generators. A standard blade may be designed for a relatively high TSR 21 as in FIG. 2 for maximum power at sites with infrequent or no noise limits and high wind power. For sites with an available blade load margin resulting from noise limits or lower mean wind speed, the lift coefficient of the blade can be increased by add-ons, and the wind turbine controller can use site-specific parameters to maintain an optimum TSR considering the add-ons.

FIG. 5 shows RPM vs wind speed for a first blade with a higher design TSR and a second blade with a lower design TSR. The first blade RPM follows slope 30 where constant TSR is maintained and slope 26 where constant RPM is maintained under standard conditions. The second blade RPM follows slope 36 where constant TSR is maintained and slope 28 where constant RPM is maintained. Both blades maintain a reduced RPM 28 under noise limits. However, the inflection point 29A for the lower TSR curve 36 occurs at a higher wind speed than the inflection point 29 for the higher TSR curve 30 under noise-limited operation. Thus, the lower TSR blade operates at maximum efficiency over a wider range of wind speeds in noise-limited conditions.

For sites where noise limits are occasional or periodic, such as nightly noise limits, a lower TSR blade may operate 37 above the noise-limited RPM 28 when noise limits are relaxed. An increase in pitch motion to decrease blade loading reduces the effective power conversion of a lower TSR blade compared to a higher TSR blade at wind speeds above some point 29B under standard operating conditions. For this reason, and as later shown in FIG. 11, a low TSR blade is not ideal for all sites under all conditions. Variable lift embodiments of the invention are described later herein to address this issue.

FIG. 6 shows power coefficient curves for three situations:

40—A blade with a first, higher design TSR under standard conditions;

42—The blade with higher design TSR under noise-limited RPM;

44—A blade with lower design TSR under noise limited RPM.

When noise limits are in effect, the blade with lower design TSR is more efficient than the blade with higher design TSR at all wind speeds above the noise-limited RPM inflection point 29 of FIG. 5 up to maximum power 45 with the lower design TSR.

FIG. 7 is a sectional view of a wind turbine blade airfoil 46 with a pressure side PS, suction side SS, leading edge LE, trailing edge TE1, and chord line 48. A flap 49 may be provided to modify the camber and/or lengthen the effective chord length of the blade, extending it to a new trailing edge TE2. The chord length 47 of the main blade element 46 is used to calculate coefficients of lift herein both before and after modification. A fixed-position flap may be provided to modify the blade for conditions of a given site, or a movable flap may be provided to adjust for changing conditions. Mechanisms for fixed and movable flaps are known, and are not detailed here. The flap may be configured to increase 49A or decrease 49B the lift coefficient of the blade relative to the unmodified blade, responsive to site specific conditions to improve or maximize annual energy production within available blade load margins. If the flap is movable, it may be managed actively by a controller 54 informed by sensors 56, such as blade strain sensors, wind sensors on the blade or tower, and/or input from an on-site weather station. Alternately, depending on cost/benefit, a fixed-position flap may be provided.

Vortex generators (VG) 50 may mounted on a track 52 that provides movable positioning 51 of the VGs on the suction side SS. The track may be surface-mounted or it may be installed flush during original manufacture. The VGs may be moved manually, for example using bolts, pins, or spring latches, or they may be actively controlled by a controller 54, for example by electric motors or hydraulic pistons. They may be moved forward to increase the lift coefficient and backward to reduce it responsive to a site-specific condition to maximize annual energy production within available blade load margins.

FIG. 8 shows examples of probability distributions of wind speeds S1, S2, S3 at three different sites, or at the same site in different seasons or times. One type of site specific condition is a mean wind speed for a given site using a Weibull distribution with a shape factor of 2. Wind loading conditions may include such wind speed distributions and may further include parameters for fatigue and extreme loads due to turbulence and peak gusts. These factors result in different fatigue loads for different sites. An Annual Energy Production (AEP) for a wind turbine can be determined relative to such a defined wind loading condition. A wind turbine is certified for a given wind distribution by the International Electrotechnical Commission (IEC). A turbine that is certified for a mean wind speed of 10 m/s can only be installed at sites with mean wind speeds up to 10 m/s. When installed at a site with lower wind speeds, there is a blade load margin on that turbine. An embodiment of the invention uses aerodynamic add-ons to increase the load on the turbine within this blade load margin, for example to fill the blade load margin, and increase annual energy production of the turbine. This allows one blade mold to provide blades optimized for each site according to wind loading conditions at each site.

It is non-obvious that increasing the blade coefficient of lift for a lower mean wind environment will result in increased annual energy production, because increasing the coefficient of lift does not inherently increase the coefficient of power in lower winds. This is seen in FIG. 6, in which the coefficient of power is the same for the higher and lower design TSR at wind speeds up to inflection point 29. However, the lower design TSR reaches maximum RPM at a higher wind speed 29A, so it spends a higher proportion of time on the optimum TSR curve 36.

Figure 9:
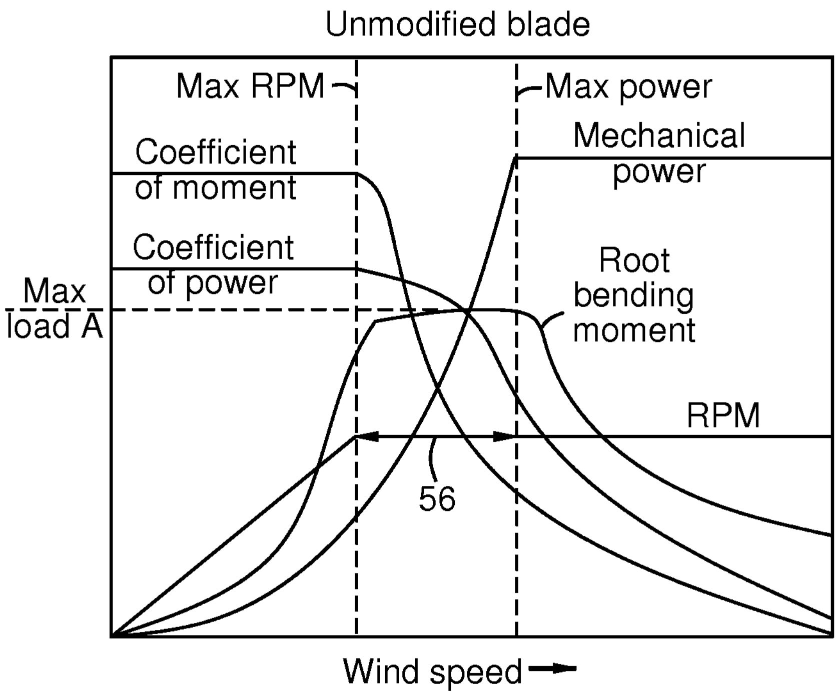
FIG. 9 shows curves of RPM, mechanical power, coefficient of power, flapwise root bending moment, and coefficient of flapwise bending moment, as functions of wind speed for a blade designed for a first wind speed environment but operating in a lower wind speed environment.

FIG. 9 shows curves of RPM, mechanical power, coefficient of power, root bending moment, and coefficient of bending moment as functions of wind speed for a blade with a higher TSR designed for a standard wind speed environment, but operating in a lower wind speed environment. Herein, "bending moment" means "flapwise" bending moment, which is bending in a direction normal to the chord line of a blade due to lift and turbulence. There is a large constant RPM region 56 between the wind speed at which maximum RPM is reached and the wind speed of maximum mechanical power. This blade has a relatively limited maximum load A in this environment.

Figure 10:
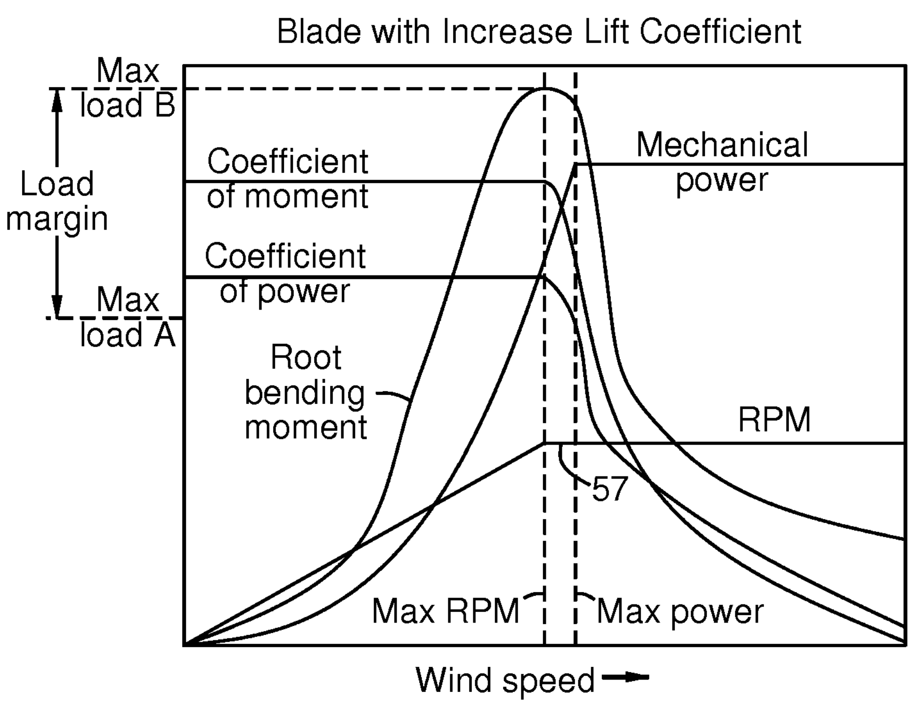
FIG. 10 shows curves as in FIG. 9 for a blade customized with increased lift coefficient for the lower wind speed environment.

FIG. 10 shows curves of RPM, mechanical power, coefficient of power, root bending moment, and coefficient of bending moment as functions of wind speed for a blade with increased lift coefficient operating in the lower wind speed environment. There is a relatively small constant speed region 57 between reaching maximum RPM and maximum power. If the blade accommodates a higher maximum load B, then there is a load margin that allows increasing lift with add-ons. In this situation, the coefficient of power remains optimum up to higher wind speed (max RPM). This increases annual energy production as shown in Table 1 below, which uses engineering simulations for a mean wind speed of 7.5 m/s. This increases annual energy production 0.45%, or about 50 MWh per turbine yearly. Such an improvement is considered very significant in this highly competitive industry. In the table below, all values are at the given maximum RPM.

TABLE 1

| Parameter | 3.0-101 Standard | 3.0-101 Lower TSR | Change (Percent) |
|---|---|---|---|
| Max RPM | 16 | 16 | 0% |
| Max Power (kW) | 3000 | 3000 | 0% |
| Max Torque (kNm) | 1927 | 1927 | 0% |
| Design TSR | 9.86 | 9.39 | −5% |
| Noise Production (dB) | 108 | 108 | 0% |
| Tip Speed (m/s) | 84.6 | 84.6 | 0% |
| Blade Load (MNm) | 6.13 | 6.43 | 5% |
| AEP @ 7.5 m/s (MWh) | 11000 | 11050 | 0.45% |
| Wind Speed at max RPM | 8.28 | 9.01 | 8.80% |
| Wind Speed at max Power | 11.31 | 11.16 | −1.30% |
| Size of Constant Speed Region (m/s) | 2.73 | 2.15 | −21.20% |

Figure 11:
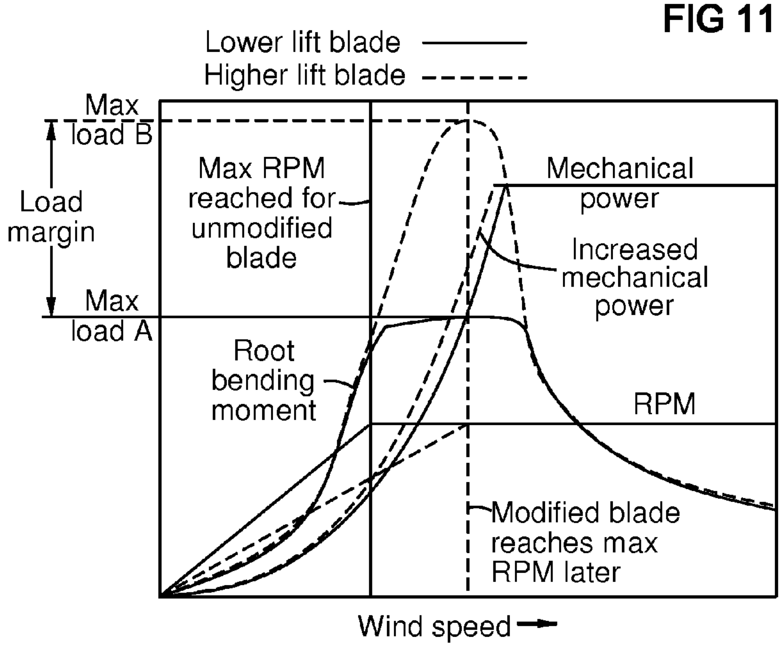
FIG. 11 compares selected curves from FIGS. 9 and 10 to show an increase in mechanical power over a significant range of wind speeds for the modified blade of FIG. 10 compared with the standard blade of FIG. 9.

FIG. 11 compares selected curves from FIGS. 9 and 10 to illustrate the increase in mechanical power throughout a significant range of wind speeds with the modified blade of FIG. 10 in comparison to the standard blade of FIG. 9. This results from reducing the constant speed region (57 of FIG. 10 versus 56 of FIG. 9). This in turn causes the higher lift blade to maintain optimum TSR in higher wind speeds and maintains it closer to the maximum power point, thus increasing the coefficient of power during a substantial proportion of operation time, increasing annual energy production.

Through the use of aerodynamic add-ons, rotor loads can be increased to increase power production by customizing blades from the same base mold design for different site conditions. This creates customized aerodynamic configurations for a line of blades to fit load envelopes and noise constraints at different sites and maximize energy production. Add-ons can be configured to increase or decrease the lift coefficient relative to the unmodified blade. For example, trailing edge flaps can be angled toward the suction side SS to reduce lift as shown by 49B in FIG. 7.

A site may be evaluated to determine whether annual energy production will increase with a modified coefficient of lift due a site-specific environmental condition such as different mean wind speed or an RPM limit for noise reduction. The following steps may be used, among others:

a) Establish a design environmental condition for a wind turbine base blade;

b) Engineer the base blade to a coefficient of lift and a corresponding optimum blade tip speed ratio (TSR) that maximizes a first annual energy production of the wind turbine when operating under the design environmental condition;

c) Determine a site-specific condition that changes the wind loading conditions compared to the design environmental condition; and d) Provide an add-on device for the base blade that maximizes a second annual energy production of the wind turbine using the modified blade under the site-specific condition by modifying the coefficient of lift and the TSR.

Figure 12:
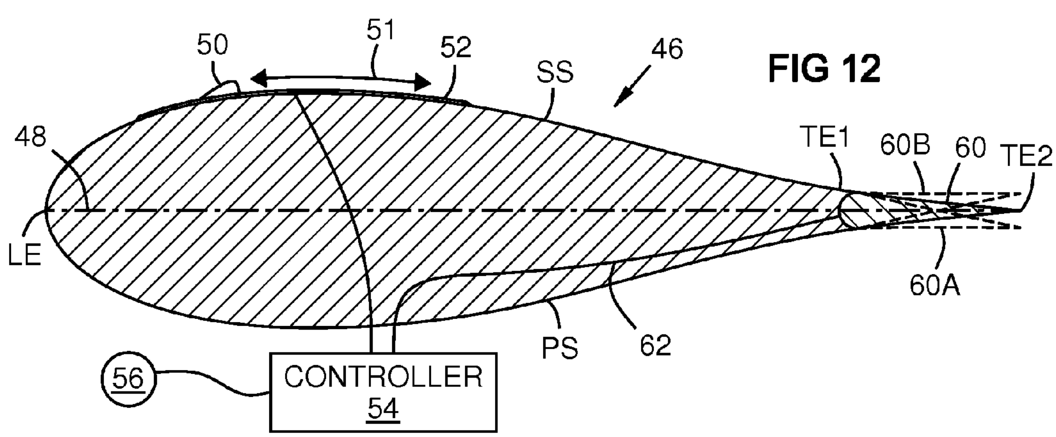

FIG. 12 is a sectional view of a wind turbine blade designed to incorporate a flap add-on. It may have a factory trailing edge TE1 that is shaped to merge with a flap 60, and is equipped with fastening hardware and a control line 62. A suitable flap 60 may be added on-site, and may be selected from movable or non-movable add-on flaps based on cost/benefit for each site. A movable flap embodiment may rotate 60A toward the pressure site to increase lift and/or may rotate 60B toward the suction side SS to decrease lift. It may be aligned with the chord line 48 or mean camber line for a site with standard design environmental conditions, providing an aligned trailing edge TE2 in that condition. Flap(s) 49, 60 and/or vortex generators 50 may cover part or most of the span of the blade either individually or in combination.

Using the method and embodiments described herein, a blade mold may be made that produces blades with optimum aerodynamics for a standard design environmental condition. The aerodynamics of the blade may be economically and effectively customized for each site with add-on devices to increase annual energy production at each site. Furthermore, the selection of a wind turbine model for a given site can take into account the described modifications in order to meet the site AEP goal. Moreover, when a lower rated wind turbine is mandated for a given site due to a limit on the maximum amount of power that the grid can handle, such lower rated wind turbine may be modified in accordance with the present invention to optimize its power production during periods when the wind speed is below that which is necessary to produce peak power.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method of customizing a wind turbine for a site-specific condition, comprising:

establishing a design environmental condition for a wind turbine blade, the blade comprising a coefficient of lift and a corresponding optimum blade tip speed ratio (TSR) that establishes a first annual energy production of the wind turbine when operating under the design environmental condition;

determining a site-specific condition that changes a wind loading condition on the blade compared to the design environmental condition;

determining a second annual energy production for the wind turbine using the blade under the site specific condition;

providing an add-on device for the blade that establishes an increased annual energy production of the wind turbine under the site-specific condition by changing the coefficient of lift and the TSR of the blade, and installing the add-on device on the blade.

2. The method of claim 1, wherein the site-specific condition reduces a maximum aerodynamic load or a fatigue load in comparison to the design environmental condition, leaving a load margin for the blade, and the add-on device increases the coefficient of lift of the blade, increasing the blade load within the blade load margin under the site-specific condition, reducing the corresponding TSR of the blade and establishing the increased annual energy production.

3. The method of claim 2, wherein the site-specific condition comprises a requirement to reduce a maximum RPM of the wind turbine to reduce noise.

4. The method of claim 2, wherein the site-specific condition comprises a mean wind speed that is lower than a mean wind speed of the design environmental condition.

5. The method of claim 1, wherein the add-on device comprises a trailing edge flap.

6. The method of claim 1, wherein the add-on device comprises a plurality of vortex generators for a suction side of the blade.

7. The method of claim 6, wherein the add-on device further comprises a mount that provides chordwise movement and selection of position of the vortex generators on the suction side of the blade.

8. The method of claim 1, further comprising providing a site-specific control parameter responsive to the site-specific condition, wherein a control device controls the add-on device responsive to the site-specific control parameter to optimize annual energy production.

9. The method of claim 8, wherein the control device monitors environmental conditions, and further comprising: providing control logic in the control device that varies the coefficient of lift of the blade according to the site specific condition by controlling the add-on device.

10. The method of claim 1, further comprising providing an automatic control system in the wind turbine that determines the site-specific condition during operation of the wind turbine, and actively varies the coefficient of lift of the blade responsive to the site specific condition by actuating the add-on device.

11. The method of claim 1, further comprising providing the add-on device to extend along a majority of a span of the blade.

12. The method of claim 1, further comprising designing the add-on device to increase a proportion of operational time of the wind turbine that the blade spends at an optimum TSR under the site-specific condition.

13. The method of claim 1, further comprising providing a plurality of vortex generators mounted in a first chordwise position for operation under a first environmental condition, and further comprising configuring the blade with the vortex generators in a second chordwise position that is farther forward than the first chordwise position for operation under a second environmental condition.

14. A method of customizing a wind turbine for a site-specific condition, comprising:

establishing a design environmental condition for a wind turbine;

engineering a coefficient of lift and a corresponding optimum blade tip speed ratio (TSR) for a blade of the wind turbine that maximizes a first annual energy production of the wind turbine when operating under the design environmental condition;

determining a noise limitation or an available wind power limitation at a given site that reduces maximum blade load and leaves an available blade load margin when the wind turbine is operated at the given site;

providing an add-on device for the blade of the wind turbine that provides a second annual energy production of the wind turbine greater than the first annual energy production when operating the wind turbine at the given site by increasing the coefficient of lift of the blade to an extent allowed by the blade load margin, and customizing the blade by installing the add-on device on the blade.

15. The method of claim 14, further comprising providing the add-on device in a form of a trailing edge flap for the blade or a vortex generator for the blade.

16. The method of claim 14, further comprising providing the add-on device in a form of vortex generators and a mechanism for mounting the vortex generators with movable positioning on a suction side of the blade.

17. The method of claim 16, further comprising movably selecting a position of the vortex generators along the suction side of the blade to control the coefficient of lift of the blade responsive to the load margin.

18. The method of claim 14, further comprising designing the add-on device to move the optimum TSR of the blade toward a peak mechanical power under the site-specific condition.

19. A method of customizing a wind turbine for a site-specific condition, comprising:

establishing a design environmental condition for a wind turbine blade design;

engineering the blade design for a coefficient of lift and a corresponding optimum blade tip speed ratio (TSR) that maximizes a coefficient of power of the wind turbine when operating under the design environmental condition;

producing a plurality of blades of the blade design for the wind turbine;

determining a site-specific condition that reduces a maximum aerodynamic load at a given site compared to the design environmental condition;

providing an add-on device for each of the plurality of blades that maximizes an annual energy production of the wind turbine at the given site by increasing the coefficient of lift of the blades and reducing the optimum TSR of the blades of the blade design, and customizing each blade of the plurality of blades by installing the respective add-on device.

* * * * *